March 19, 1940.  A. H. PEGLOW  2,193,881

DEVICE FOR WHEEL SUSPENSION

Filed Oct. 2, 1937

INVENTOR
Albert H. Peglow
BY
ATTORNEY

Patented Mar. 19, 1940

2,193,881

UNITED STATES PATENT OFFICE 2,193,881

DEVICE FOR WHEEL SUSPENSION

Albert H. Peglow, Cudahy, Wis.

Application October 2, 1937, Serial No. 167,001

1 Claim. (Cl. 267—60)

This invention relates to improvements in devices for front wheel suspension and more particularly to a novel front wheel spring suspension.

An object of the invention is to provide a device of the type which will adequately perform an individual spring action as used on modern cars and which will eliminate numerous parts now found in similar devices of the type.

Another object of the invention is to provide devices which will tilt the front wheels in steering the same to overcome lateral drag on the tires of said wheels.

Another object of the invention is to comprise an improved steering device with an improved individual spring suspension appliance having a normal angle adapted to efficiently absorb conventional road shocks.

Another object of the invention is to provide devices of the type having superior facilities for lubrication of the parts with simpler means for lubricating the same.

Other and further objects of the invention will appear as the description proceeds, reference being had to the accompanying drawing, in which.

Figure 1:
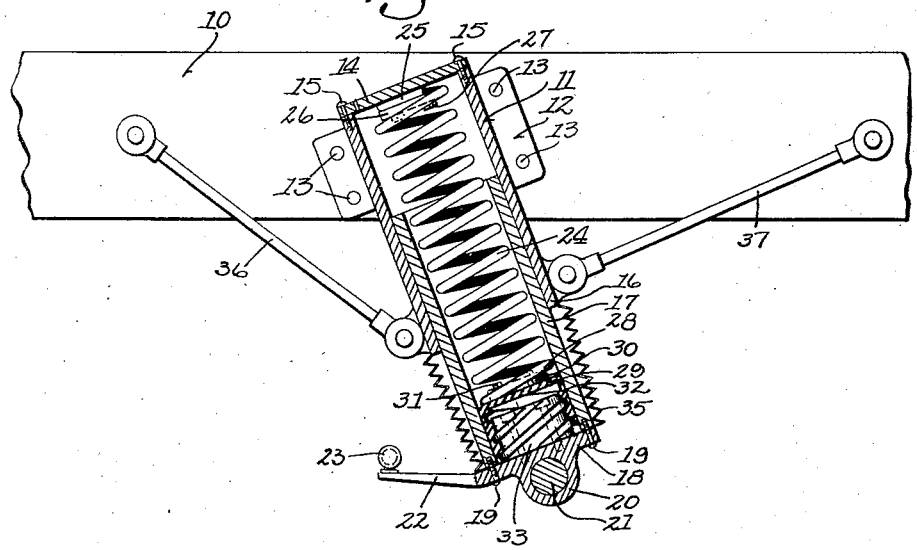
Fig. 1 is a side view partly in section and partly in elevation of a wheel suspension device embodying my invention.
Figure 2:
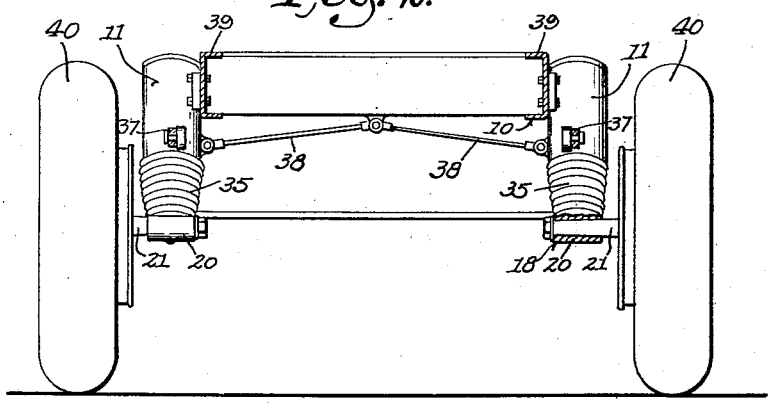
Fig. 2 is a front view similar to Fig. 1 showing the devce attached to the frame of an automobile and to the front wheels thereof.
Figure 3:
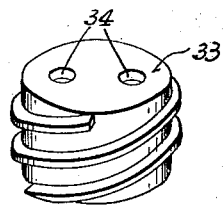
Fig. 3 is a perspective view of a worm cam employed in the device.

Referring more particularly to the drawing the numeral 10 represents the frame of an automobile to which is attached the upper tubular member, 11, of the device, by means of the plate, 12, secured by fastening means, 13. The member, 11, is closed at the top by the disc or plate, 14, and the threaded means, 15. The tubular member, 11, is open at its lower end, 16, and receives with a sliding fit the lower tubular member, 17, to which is subjoined the member, 18, which is attached to the said tube by threaded means, 19, and which has a lower laterally extending sleeve formation, 20, therein for receiving the wheel spindle, 21. Attached to member, 18, and extending backwardly thereof is an arm, 22, for connection with a tie rod, 23. Housed within the tubular members, 11 and 17, is a coil spring, 24, which has a reduced portion, 25, at its upper end where a plate, 26, and the threaded means, 27, secure said spring to the end member, 14. The lower end, 28, of spring, 24, has a reduced portion, 29, which is similarly secured by plate, 30, and threaded means, 31, to an inverted cup member, 32, which is internally threaded to receive the worm cam, 33, and is movable with a sliding fit within the lower tube member, 17. The worm cam, 33, is attached by threaded means, 34, to the spindle housing 18.

The cams of the front wheels are threaded oppositely. In the case of the right front wheel, the cam thread is so arranged that when the wheel turns to the right of the vehicle, the cam 33 will turn into the cup, and as the left front wheel turns right, its related cam will turn outwardly of the cup 32.

An accordion pleated leather boot, 35, is attached between the outside of the lower end of the tube, 11, to the outside of the lower end of the tube, 17, for retaining lubricant which will be extruded between the sliding surfaces of the tubes. Rear braces, 36, and forward braces, 37, combine with the lateral braces, 38, attached to frame, 39, to hold the tube, 11, in a fixed position.

In use, while the vehicle is traveling a straight forward path, the springs and tubes will maintain a relatively equal extension. When unequal road surfaces occur the springs will react individually to accommodate the wheels, 40, to such inequalities. When the front wheels are turned the tube, 17, on the wheel traveling the longest route will be lengthened by the turning action of the cam, 33, within the cup member, 32. The tube, 17, attached to the wheel traveling the shortest route on the turn will be shortened due to the opposite action of the cam, 33, attached thereto. In turning, both wheels will be tilted with their tops nearer the rear of the vehicle, to correspond with the tilted angle of the tubes, 11, as attached to the vehicle. It will thus be seen that the front end of the vehicle will be banked in making a turn as also will the tire thereof with a resultant gain in equality of tread wear.

It will be understood that the device is capable of many modifications in structure and design without departing from the spirit of the invention, within the scope of the appended claim.

Having thus described my invention what I claim and desire to secure by Letters Patent of the United States, is:

In a device of the class described a plurality of telescopic tubular elements engaged with a sliding fit, means for attaching one of said elements to the frame of an automobile, a coiled expansion spring within the tubular elements for maintaining a normal extension thereof, an internally threaded cup member attached to an end of the spring and a worm cam engaged within said cup member and adapted to extend the tubular members relatively when the wheel bearing or outer tube is turned inwardly with reference to the vehicle and to telescope said members inwardly when the lower tubular member is turned outwardly of the automobile.

ALBERT H. PEGLOW.